No. 740,445. PATENTED OCT. 6, 1903.
A. LANGERFELD.
SPROCKET WHEEL.
APPLICATION FILED MAY 5, 1899.
NO MODEL.
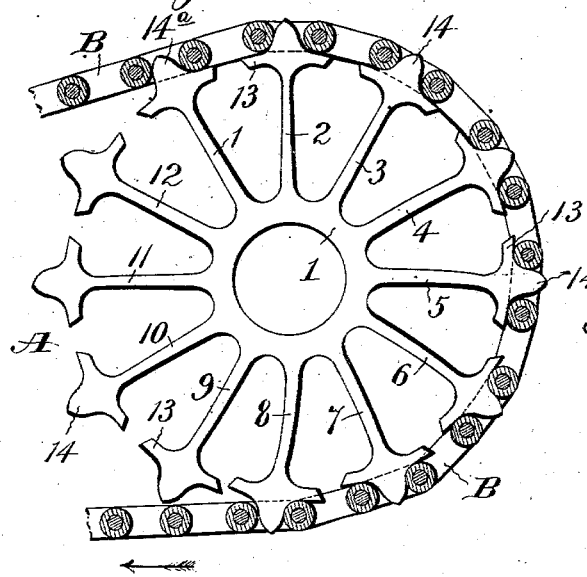
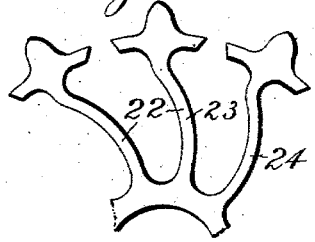
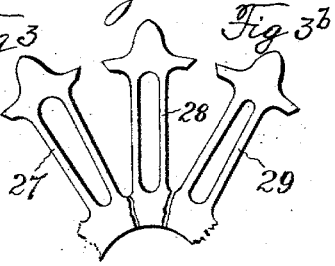
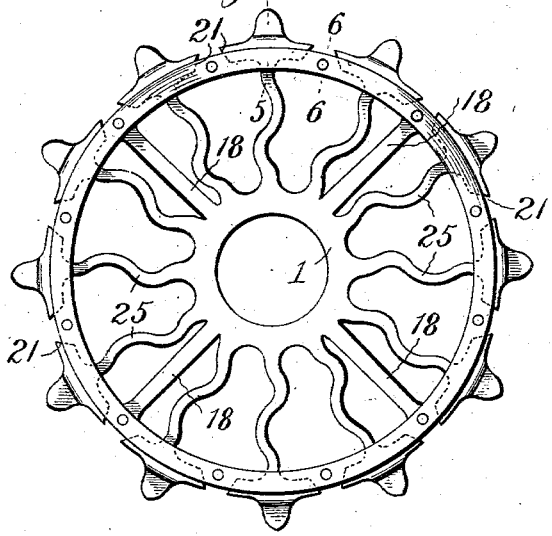
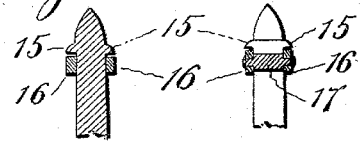
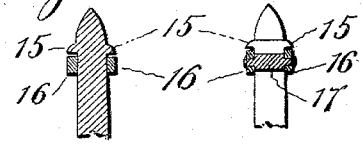
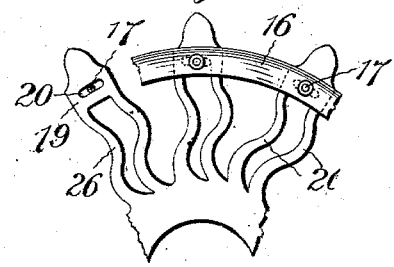
Witnesses
Jas E. Hutchinson
Arthur L. Bryant
Inventor
Arthur Langerfeld
By Watson & Watson
Attorneys.

No. 740,445. Patented October 6, 1903.

UNITED STATES PATENT OFFICE.

ARTHUR LANGERFELD, OF SCRANTON, PENNSYLVANIA.

SPROCKET-WHEEL.

SPECIFICATION forming part of Letters Patent No. 740,445, dated October 6, 1903.

Application filed May 5, 1899. Serial No. 715,763. (No model.)

*To all whom it may concern:*

Be it known that I, ARTHUR LANGERFELD, a citizen of the United States, residing at Scranton, in the county of Lackawanna and State of Pennsylvania, have invented a new and useful Sprocket-Wheel, of which the following is a specification.

My invention comprises a sprocket-wheel having teeth normally spaced at equal distances apart, but arranged to yield slightly circumferentially in order to adjust themselves to suit the pitch of the chain or belt which travels upon the wheel.

By means of my improvements the sprocket-teeth automatically adjust themselves to suit the pitch of the chain passing over them and in this way prevent climbing of the chain upon the teeth and the friction, wear, and strain incident thereto. It is well known that in practice sprocket-chains become stretched, owing both to the wear at the pivots and to the stretching of the links. In sprocket-wheels having fixed teeth there is no way of increasing the pitch of the teeth, and for that reason when the chain becomes stretched the links soon climb upon the teeth. This not only increases the friction between the chain and the wheel, but also increases the tension of the chain and the wear upon the links. By means of my improvements these difficulties are obviated. One serious difficulty arising in the use of sprocket-wheels having fixed teeth is that unless the pitch of the chain corresponds perfectly to the pitch of the teeth the stress of the chain is exerted upon only one tooth, whereas with my improved wheel the stress is distributed between all of the teeth covered by the chain. Furthermore, when the chain stretches from wear the slack which exists between the series of links at any given time upon the sprocket-wheel will be taken up by the yielding of the sprocket-teeth. A chain operated upon wheels of this description will wear much longer than it will if operated upon wheels having rigid teeth.

In the accompanying drawings, which illustrate my invention, Figure 1 is a side view of one of my improved wheels in its simplest form, a portion of the sprocket-chain being shown in connection therewith. Figs. 2, 3, 3ª, and 3ᵇ are partial views showing modified forms of spokes. Fig. 4 is a side view of a wheel having a supporting-ring for the teeth and stops to limit the circumferential movement of the teeth. Fig. 5 is a section on the line 5 5 of Fig. 4. Fig. 6 is a section on the line 6 6 of Fig. 4, and Fig. 7 is a partial side view of another form of sprocket-wheel embodying my improvements.

Referring to Fig. 1 of the drawings, A indicates a sprocket-wheel consisting of a hub 1 and a series of radial spokes, indicated by the figures 1 to 12, inclusive, each spoke having a rim-section 13 at its outer end and a tooth 14 upon the rim-section. Each spoke is formed of spring metal and, as shown in the drawings, is made integral with the hub. The sections 13 of the rim are separated from each other, so that the spokes may bend in the plane of the wheel for a short distance in order to permit the teeth to move circumferentially in either direction. The teeth are normally held at equal distances apart by the spring-spokes, which extend radially outward from the hub.

When a chain having the same pitch as the teeth is applied to the wheel, the spokes from 2 to 8, inclusive, upon which the links of the chain rest, will remain at equal distances apart. After the chain has become worn either by the stretching of the links or wear at the pivotal connections the spokes will yield in the direction of the pull of the chain, thus permitting the teeth to adjust themselves to the increased length of the links.

As shown in the drawings, B represents a chain in which the links have become stretched to such an extent that if the sprocket-teeth were fixed relatively to one another said links would no longer fit the teeth, but would climb upon them. With my arrangement of spring-spokes, however, a draft upon the chain in the direction indicated by the arrow will cause the spokes from 2 to 8, inclusive, to bend in the direction of rotation by progressively-increasing amounts, the distance between two adjacent teeth being thus increased by a distance equal to the stretch of a single link and the last tooth upon the spoke 8 being displaced from its normal position by a distance equal to the total stretch in the chain between the spokes 2 and 8. In a sprocket-wheel having fixed teeth the pull of the chain is usually exerted upon only one tooth, whereas in my form of sprocket-wheel it will be seen that the strain is always distributed throughout the entire series of teeth against which the chain rests.

Ordinarily the spoke 2 will not be moved to any appreciable extent from its normal position, owing to the fact that the most of the strain will be taken by the spokes in advance of it. It might happen, however, that with a heavy draft upon the chain the spoke 2 might move to such an extent that the tooth 14ᵃ upon the next spoke 1 would not enter the opening in its appropriate link in the chain unless suitable stops were provided to limit the movement of the teeth. The maximum distance between the teeth may be regulated so that the approaching tooth will always enter the slot in the chain. This may be accomplished in various ways. As shown in Figs. 4, 5, and 6, the rim-sections are formed with laterally-projecting ribs or flanges 15, and within these flanges on either side of the spokes are arranged rings 16, these rings being united by means of pins 17, which extend centrally between the ends of the rim-sections 13. These rings, as shown in Fig. 4, are supported by arms 18, rigidly connected with the hub. In Fig. 7 the rim-sections 19 are provided with arcuate slots 20, and the stops or pins 17 extend through these slots. In Fig. 4 the movement of the teeth is limited by the abutment of the ends 21 of the rim-sections against the stop-pins, said ends being preferably inclined, as shown, so that any dirt which may enter between the sections will be forced out by the inclined faces. In Fig. 7 the movement of the teeth is limited by the abutment of the pins against the ends of the slots. In these Figs. 4 and 7 it will be noted that the spokes are reversely curved, thus permitting them to yield more readily circumferentially, and in Fig. 7, wherein the rings 16 are not rigidly supported from the hub, said spokes may yield radially as well as circumferentially. In the latter figure, the rings being connected to each rim-section, if pressure is brought against the rings at one side of the wheel this pressure will be transmitted to the spokes upon the opposite side of the wheel through the rings, owing to the fact that the spokes are capable of yielding radially as well as circumferentially, and the sprocket-teeth will become eccentric to the hub of the wheel. If the links of the chain are unequally worn, this yielding of the wheel will tend to keep the chain evenly taut, notwithstanding the inequalities in the links. In Fig. 4 the wheel cannot become eccentric and the movement of the teeth is always in the arc of a true circle.

The springs which maintain the teeth normally at equal distances apart may be variously arranged. In the drawings these springs are the spokes of the wheel, and these may have different forms. As shown in Fig. 1, they consist of single radial arms. In Fig. 2 the curved arms 22, 23, and 24 are spirally curved. In Fig. 4 single spokes 25 are shown, said spokes having a reversely-curved or wavy outline and their general direction being radial. In Figs. 3, 3ᵃ, 3ᵇ, and 7 the spokes are double, two spokes being united to a single rim-section. In the last-mentioned figure the spokes 26 are shown with a wavy outline, while in the other figures the spokes are straight. The general direction of the spokes is preferably radial; but they may be otherwise disposed. In Fig. 3 the arms 27 of the double spoke are radial. The arms 28 in Fig. 3ᵃ are parallel, and the arms 29 of the spoke in Fig. 3ᵇ approach each other toward their outer ends. The double spokes are more rigid than the single ones, and the motion of the teeth when no guiding-rings are employed is slightly different from the motion of the teeth upon the single spoke. In wheels of small diameter the spoke having a wavy outline is preferable, as such spokes may be made more yielding than straight spokes of the same radial length. By making the curvature more pronounced than in the spokes shown in the drawings their elasticity will be increased.

If the spokes are made straight, as shown in Fig. 1, and the wheel is otherwise made like Fig. 7, it will be radially as rigid as a solid sprocket-wheel, for the reason that the rings will transmit the pressure brought against one side of the wheel to the spokes upon the opposite side, and said spokes being straight cannot yield radially. The ribs or flanges 15, which extend over the rings in Fig. 4, provide bearing-surfaces for the links which would otherwise rest directly upon the rings. The bearing-surfaces between the ribs and the rings may be kept lubricated and free from dirt with greater ease than can be the exposed edges of the rings. In Fig. 7 it will be noted that the slots in the spokes are covered by the rims, thus excluding the dust from said slots, and it will also be noted that these rings serve to transmit the stress brought against the stops to those teeth and spokes which do not carry links whenever the pull on the chain is so great as to bend the spokes over far enough to turn the rings a distance equal to the length of one of the slots.

It is obvious that a single ring might be made to take the place of the two rings shown, suitable means being provided for holding the ring against the spokes. As illustrated in the drawings, the two rings are united by the stop-pins and, in effect, constitute a single ring. The rings may be narrow, as shown, or they may be broadened into disk form to cover the spokes.

Various modifications may be made in the construction of the wheel without departing from the spirit and scope of my invention.

What I claim as new, and desire to secure by Letters Patent of the United States, is—

1. A sprocket-wheel having a series of suitably-supported teeth movable circumferentially toward and from each other and springs normally holding said teeth at equal distances apart.

2. A sprocket-wheel comprising a hub, a series of circumferentially and radially yieldable spokes attached thereto at their inner ends, and a tooth upon the outer end of each spoke.

3. A sprocket-wheel having a series of suitably-supported teeth movable circumferentially toward and from each other, stops arranged to limit the movement of the teeth, and springs normally holding said teeth at equal distances apart.

4. A sprocket-wheel having a series of suitably-supported rim-sections and teeth thereon, said sections being separated from one another and movable circumferentially toward and from each other, and springs normally holding said sections apart.

5. A sprocket-wheel having a series of suitably-supported rim-sections and teeth thereon, said sections being separated from one another and movable circumferentially toward and from each other, springs normally holding said sections apart, and stops arranged to limit the movement of the rim-sections.

6. A sprocket-wheel comprising a hub, a series of circumferentially and radially yieldable spokes attached thereto at their inner ends, each spoke having a rim-section and a tooth at its outer end, and stops arranged to limit the circumferential movement of the rim-sections.

7. A sprocket-wheel comprising a hub, a series of spring-spokes connected at their inner ends to said hub, the outer ends of said spokes being movable circumferentially toward and from each other, and a sprocket-tooth upon each spoke.

8. A sprocket-wheel comprising a hub, a series of spring-spokes connected at their inner ends to said hub, the outer ends of said spokes being movable circumferentially toward and from each other, and a rim-section, having a tooth thereon, upon the outer end of each spoke.

9. A sprocket-wheel comprising a hub, a series of spring-spokes attached thereto at their inner ends, the outer ends of said spokes being movable toward and from each other, a sprocket-tooth upon each spoke, and a stop for limiting the movement of the spoke.

10. A sprocket-wheel comprising a hub, a series of spring-spokes connected to said hub at their inner ends, the outer ends of said spokes being movable circumferentially toward and from each other, a tooth upon each spoke, a ring arranged to support the teeth radially, said ring having stops adapted to limit the circumferential movement of the spokes.

11. A sprocket-wheel comprising a hub, a series of spring-spokes connected to said hub at their inner ends, the outer ends of said spokes being movable circumferentially toward and from each other, a tooth upon each spoke, and a ring arranged to support the teeth radially.

12. A sprocket-wheel comprising a hub, a series of spring-spokes attached thereto, said spokes being adapted to yield radially and circumferentially, a rim-section, carrying a tooth, upon each spoke, each section having a slot therein, a ring arranged at the side of said rim-sections, and a series of pins secured to said ring and extending through said slots.

13. A sprocket-wheel comprising a hub, a series of spring-spokes attached thereto at their inner ends, the outer ends of said spokes being movable circumferentially toward and from each other, a sprocket-tooth upon each spoke, and a ring arranged adjacent to said teeth and adapted to support the chain.

14. A sprocket-wheel comprising a hub and a series of circumferentially-yieldable spring-spokes attached thereto, each spoke having a plurality of arms and a tooth connected to the outer ends of said arms.

ARTHUR LANGERFELD.

Witnesses:
R. ALLAN CHASE,
M. E. WELLS.